United States Patent [19]

Genter et al.

[11] 4,327,355
[45] Apr. 27, 1982

[54] DIGITAL DEVICE WITH INTERCONNECT MATRIX

[75] Inventors: Melvyn E. Genter, San Diego; Hanan Potash, La Jolla, both of Calif.

[73] Assignee: Burroughs Corporation, Detroit, Mich.

[21] Appl. No.: 162,057

[22] Filed: Jun. 23, 1980

[51] Int. Cl.³ .......................... H04Q 3/42; G06F 7/38
[52] U.S. Cl. .................................. 340/825.9; 365/189
[58] Field of Search ........................ 340/166 R, 147 P; 364/115, 490, 491; 365/49, 94, 103, 231, 189

[56] References Cited

U.S. PATENT DOCUMENTS

| | | | |
|---|---|---|---|
| 4,091,359 | 5/1978 | Rossler | 340/166 R |
| 4,153,943 | 5/1979 | Anderson | 365/49 |
| 4,153,950 | 5/1979 | Nosowicz et al. | 365/231 |

Primary Examiner—Donald J. Yusko
Attorney, Agent, or Firm—Charles J. Fassbender; Kevin R. Peterson

[57] ABSTRACT

Disclosed is a digital device on a semiconductor chip, which is comprised of a plurality of storage means for storing digital signals therein, a plurality of functional means for performing functional operations on the digital signals, and an interconnect matrix. The matrix includes a plurality of input busses connected to receive signals from the storage means and the functional means, and a plurality of output busses connected to send signals to the storage means and functional means. The interconnect matrix further includes N sets of selectable electrical contacts where N is any positive integer. Each set selectively intercouples the input busses to the output busses in various parallel paths. Signals are transferred between the input and output busses through any one set of the N sets of electrical contacts in response to N respective control signals.

16 Claims, 11 Drawing Figures

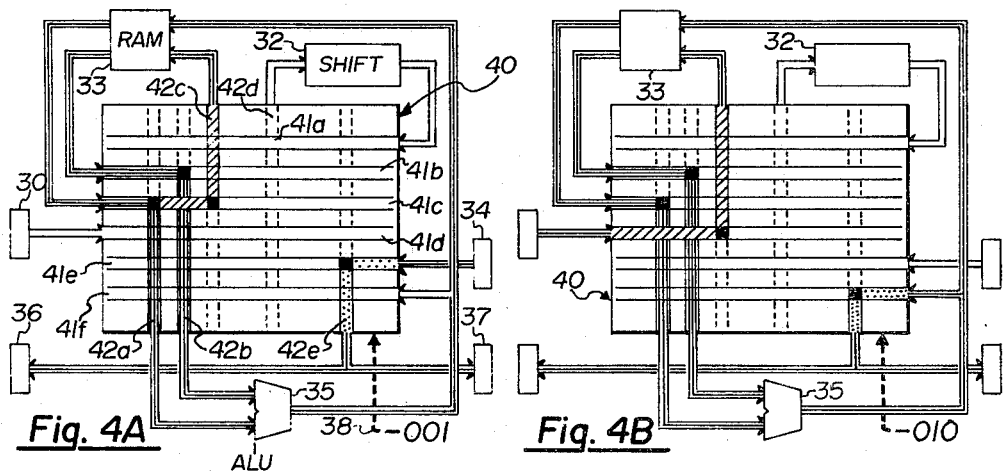
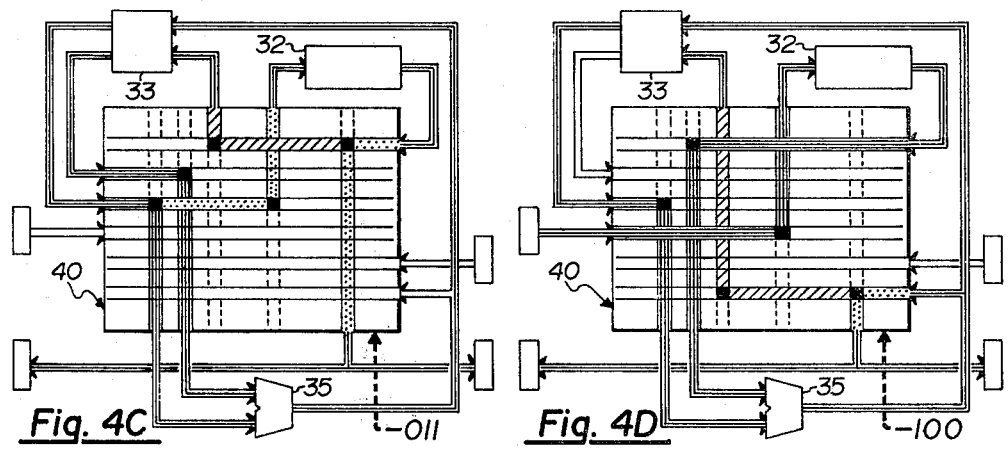
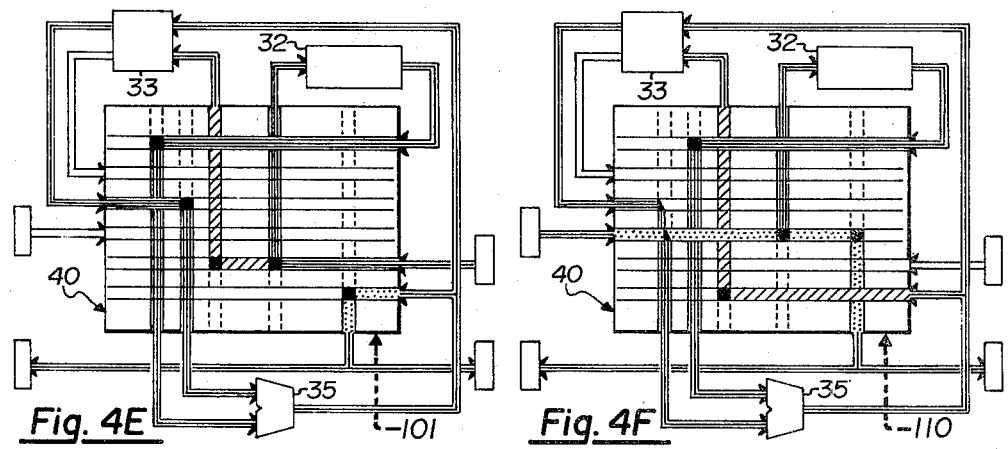

DIGITAL DEVICE WITH INTERCONNECT MATRIX

BACKGROUND OF THE INVENTION

This invention relates to the architecture of digital devices on a semiconductor chip which store and process digital signals. These devices include, for example, digital microprocessors and digital controllers for various equipment.

Two such digital devices of the prior art are illustrated in FIGS. 1 and 2. The FIG. 1 device performs its functional operations in a serial fashion; whereas the FIG. 2 device performs its functional operations in a parallel fashion. Thus, the FIG. 1 device has a simpler architecture, but is slower in operation, than the FIG. 2 device.

Suppose, for example, that one function which those devices were to perform is to receive digital operands from input registers IR1 and IR2, to add those operands together, to store that sum in output register OR1, to shift that sum by one bit position to the right, and to store the shifted sum in output register OR2. This operation takes four cycle times to perform in the FIG. 1 device; whereas it takes only two cycle times to perform in the FIG. 2 device.

During the first cycle time in the FIG. 1 device, data in register 10 is transferred through multiplexor 11 and shifter 12 (which is controlled to shift zero bit positions) into a RAM 13. Next, data from input register 14 is sent through multiplexor 11 to arithmetic logic unit 15; the previously stored data in RAM 13 is also sent to arithmetic logic unit 15; and the sum is stored in RAM 13. Next, the sum in RAM 13 is sent to shifter 12 and to output register 16; and the shifted sum from shifter 12 is stored back in RAM 13. Then, the shifted sum in RAM 13 is sent through multiplexor 11 to output register 17.

By comparison, in the FIG. 2 device, the same operation is performed as follows. During the first cycle, data in input registers 20 and 24 are sent through respective multiplexors 21b and 21c to arithmetic logic unit 25; and the sum is then sent through multiplexors 21a and 21e respectively to RAM 23 and output register 26. Then in the next cycle, the stored sum in RAM 23 is sent through multiplexor 21d to shifter 22, and the shifted sum is sent through multiplexor 21e to output register 27.

The speed at which the FIG. 2 device performs its operations is, of course, an attractive feature. However, to obtain that speed, it is necessary that each multiplexor 21a–21e be sent separate control signals on respective leads 28a–28e from a control memory 29. Since each multiplexor 21a–21e has six inputs, at least three encoded digital signals must be sent to each of the multiplexors on the respective control leads.

Thus, control memory 29 which stores these control signals must be relatively wide in comparison to control memory 19 of the FIG. 1 device. That FIG. 1 device has only one multiplexor 11, and it requires only two encoded digital control signals on leads 18 to select its inputs. This, of course, is also an attractive feature because a relatively narrow control memory requires less chip space for its implementation.

Accordingly, a primary object of the invention is to provide a new and improved architecture for a digital device on a semiconductor chip which allows data to be processed quickly in various parallel paths in response to a relatively narrow control word.

BRIEF SUMMARY OF THE INVENTION

These and other objects are accomplished in accordance with the invention by a digital device on a semiconductor chip, which is comprised of a plurality of storage means for storing digital signals therein, a plurality of functional means for performing functional operations on the digital signals, and an interconnect matrix. The matrix includes a plurality of input busses connected to receive signals from the storage means and the functional means, and a plurality of output busses connected to send signals to the storage means and functional means. The interconnect matrix further includes N sets of selectable electrical contacts where N is any positive integer. Each set selectively intercouples the input busses to the output busses in various parallel paths. Signals are transferred between the input and output busses through any one set of the N sets of electrical contacts in response to N respective control signals.

BRIEF DESCRIPTION OF THE DRAWINGS

Various features and advantages of the invention will best be understood by reference to the following detailed description and accompanying drawings wherein:

FIGS. 4A–4F illustrate the operation of a programmable interconnect matrix within the FIG. 3 device.

DETAILED DESCRIPTION

Figure 1:
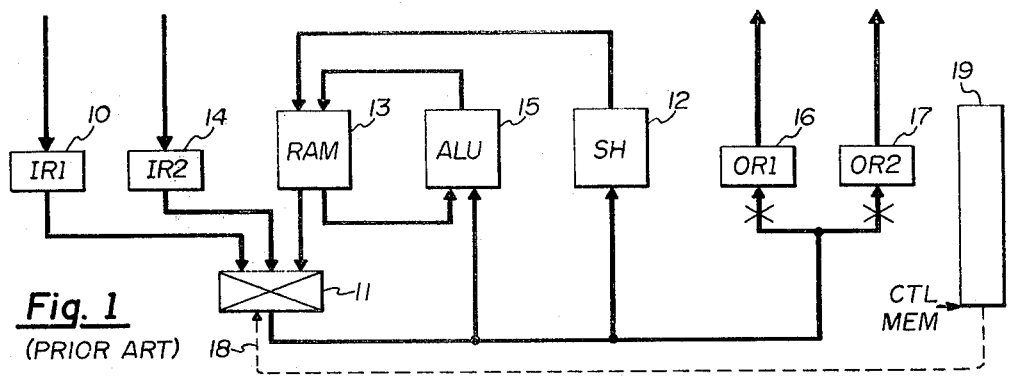
FIGS. 1 and 2 are schematic diagrams of two prior art devices for storing and processing digital signals on a semiconductor chip.
Figure 2:
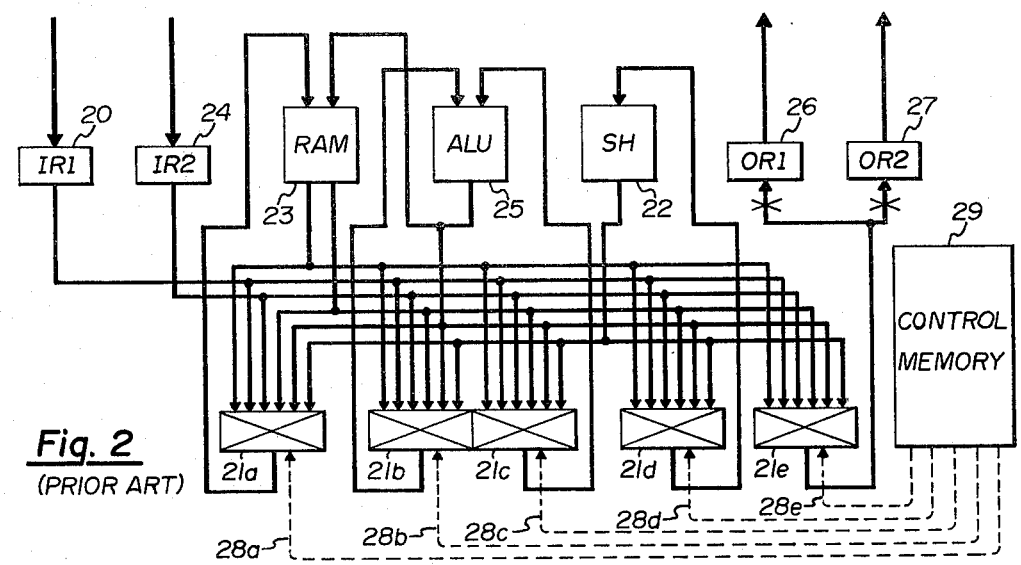
Figure 3:
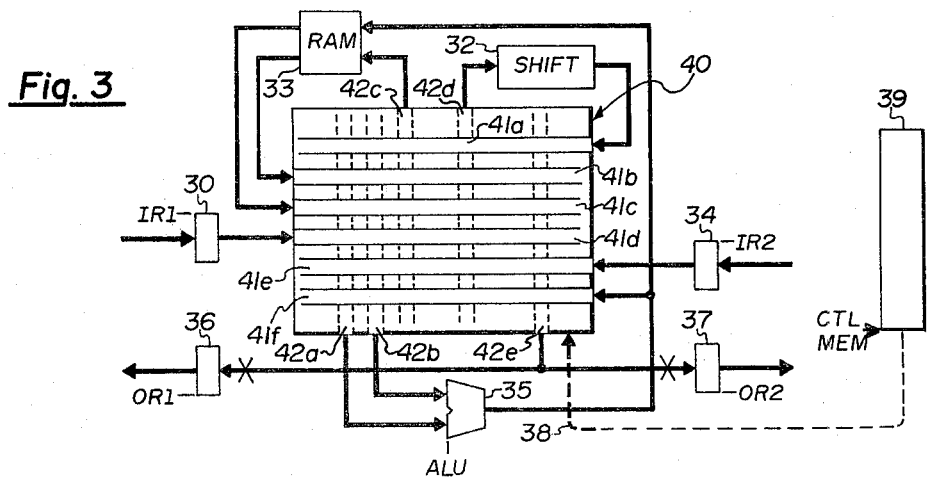
FIG. 3 is a schematic diagram of a device which stores and processes digital signals in accordance with the invention.

Referring now to FIG. 3, a digital device on a semiconductor chip which is constructed in accordance with the invention will be described. That device includes a pair of input registers 30 and 34, a pair of output registers 36 and 37, a RAM 33, an arithmetic logic unit 35, and a shifter 32. Basically, components 30, 33, 34, 36, and 37 provide the means for storing digital signals while components 32 and 35 provide the means for performing functional operations on those signals. But the manner in which the storage means and function performing means are interconnected to perform various parallel operations during any one particular machine cycle is determined by an interconnect matrix 40.

Matrix 40 includes a plurality of input busses 41a–41f, and a plurality of output busses 42a–42e. Each input buss 41a–41f is connected to receive signals from a respective one of the storage means or functional means 30–37; and each output buss is connected to send signals to a respective one of those same storage and functional means. These interconnections are illustrated in FIG. 3 by solid dark lines to/from matrix 40.

Also included in matrix 40 are N sets of selectable electrical contacts (where N is any positive integer). Each set of contacts selectively intercouples the input busses to the output busses. One figure is required to illustrate any single set of these electrical contacts; and the N sets of contacts are illustrated in FIGS. 4A-4F.

Matrix 40 further includes a means for transferring signals from input busses 41a-41f through any one particular set of the N sets of electrical contacts to the corresponding output busses 42a-42e in response to encoded control signals on leads 38. That is, in response to one code on leads 38, signals are transferred from the input busses to the output busses through one set of electrical contacts; in response to another code on leads 38, signals are transferred from the input busses to the output busses through another set of electrical contacts; etc.

Since there are N sets of electrial contacts, the signals on leads 38 need only contain N different codes. At the same time however, digital data can be processed relatively quickly by the FIG. 3 device because the multiple input busses and multiple output busses in interconnect matrix 40 enable data to be processed in different parallel path in response to each of the N codes.

As a specific example, consider now the schematic diagrams of FIGS. 4A-4F. Each of those figures shows one set of selectable electrical contacts which intercouple the input busses to the output busses. As stated above, the particular set of selectable contacts which is "activated" at any particular time instant is determined by the state of the encoded control signals on leads 38.

FIG. 4A illustrates that the first set of electrical contacts intercouple busses 41c and 42a, busses 41b and 42b, and busses 41e and 42e. Signals are sent through this set of contacts in response to a function code of (001) on leads 38. As a result, data is processed in three independent parallel paths. One of those paths is from RAM 33 through arithmetic logic unit 35 and back to the RAM. Another path is from one ouput of RAM 33 and back to a different input of the RAM. And another path is from input register 34 to output registers 36 and 37. These three paths are indicated in FIG. 4A by three different sets of cross-hatching.

A second set of contacts, which is selected by a function code of (010) on leads 38, is indicated in FIG. 4B. Again, this set of contacts provides three different parallel paths. One path is from RAM 33 through arithmetic logic unit 35 and back to the RAM. Another path is from input register 30 to RAM 33. And another path is from RAM 33 through arithmetic logic unit 35 and to output registers 36 and 37.

Each of the contact sets illustrated in FIGS. 4C, 4D, 4E, and 4F also provide three different parallel data paths. Those paths are determined by the location of the contacts, which are selected by the system designer. Thus the contacts provide those parallel paths that are most useful for the particular type of data processing that is to be done, which makes the device very flexible.

As particular examples of this flexibility, note that the FIG. 4A set of contacts couple each of the output busses to different input busses; the FIG. 4C set of contacts intercouples some of the output busses to the same input busses; and the FIG. 4F set of contacts intercouples portions of different input busses to a single output buss. And despite this flexibility, the disclosed device is well suited for implementation on a semiconductor chip because the size of the control word which controls all of these various parallel paths is relatively narrow.

Figure 5:
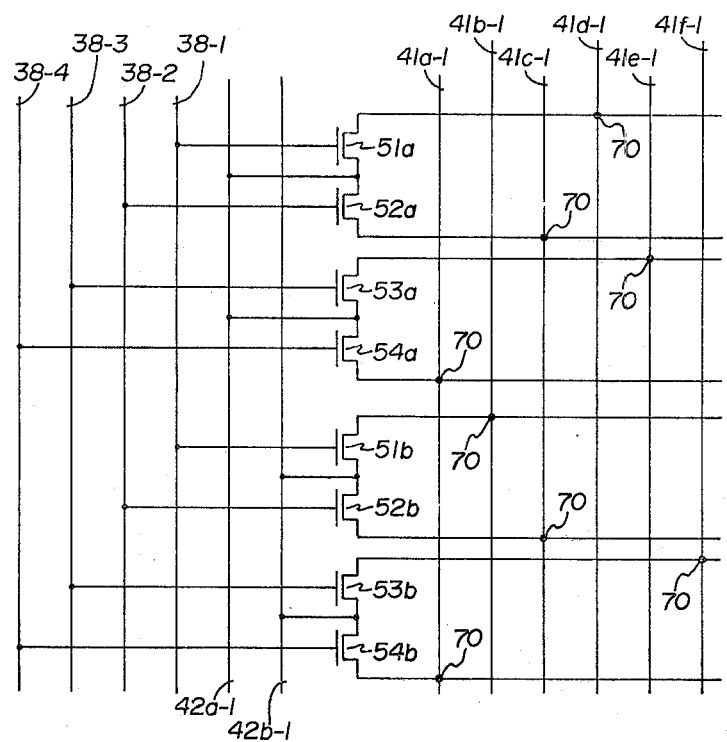
FIG. 5 is a circuit diagram of a portion of the interconnect matrix of FIG. 3.

Referring now to FIG. 5, there is illustrated a circuit diagram of a portion of matrix 40. In that figure, reference numerals 41a-1 through 41f-1 respectively indicate the first bit of input busses 41a-41f; reference numerals 42a-1 and 42b-1 respectively indicate the first bit of output busses 42a and 42b; and reference numerals 38-1 through 38-4 indicate four control lines which receive respective decode signals of the codes on control lines 38.

Output buss 42a-1 is connected to the source of four transistors 51a-54a; and output buss 42b-1 is connected to the source of four other transistors 51b-54b. Transistors 51a and 51b have their gates coupled to control line 38-1; transistors 52a and 52b have their gates coupled to control line 38-2; transistors 53a and 53b have their gates coupled to control line 38-3; and transistors 54a and 54b have their gates coupled to control line 38-4.

A code of 001 on leads 38 generates a high logic signal on lead 38-1; a code of 010 on leads 38 generates a high logic signal on lead 38-2; etc. And a high logic signal on the leads 38-1 through 38-4 causes the respective transistors to which they are connected to conduct.

The drain of each transistor 51a-54a and 51b-54b is extended to lie transverse to each of the input buss leads 41a-1 through 41f-1. At the intersection of these drain extensions and input buss leads, the selectable contacts are made. Some exemplary selectable contacts are indicated in FIG. 5 by darkened circles 70 at the intersection points. One contact for example, occurs at the intersection of buss 41e-1 and the extended drain of transistor 51a; another contact occurs at the intersection of buss 41c-1 and the extended drain of transistor 52a; etc.

By properly choosing the number of contacts 70 and their location, digital signals on any of the input busses are selectively coupled in response to any code on leads 38 to any of the output busses. For example, a high control signal on lead 38-1 selectively couples signals on input buss 41d-1 to output buss 42a-1; and selectively couples signals on input buss 41b-1 to the output buss 42b-1. As another example, a high logic signal on lead 38-2 selectively couples signals on input buss 41c-1 to both output busses 42a-1 and 42b-1.

Figure 6:
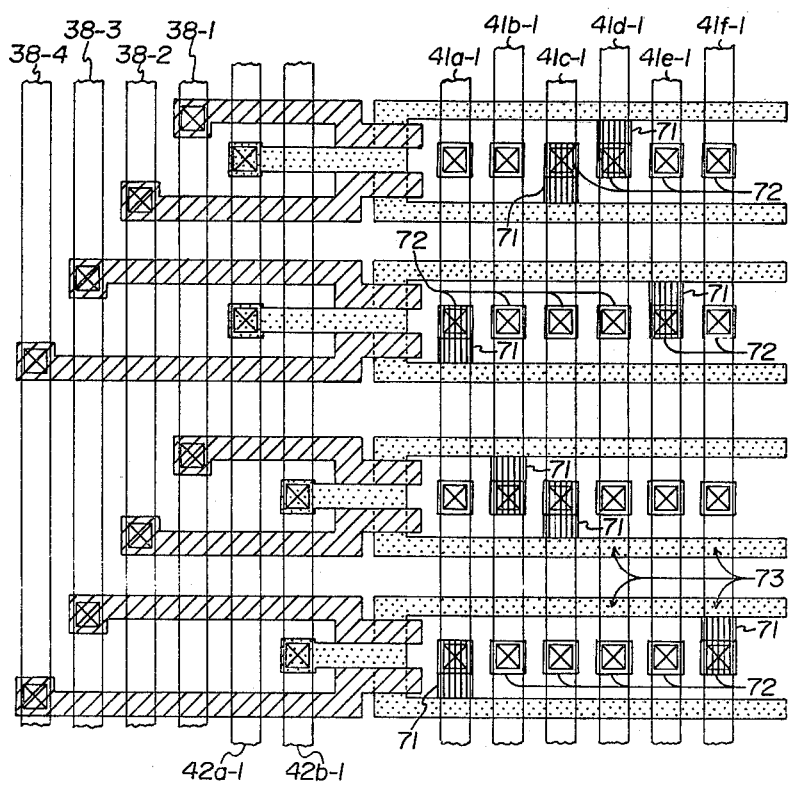
FIG. 6 is a physical layout on a semiconductor chip of the circuit of FIG. 5.

One preferred physical implementation of the FIG. 5 circuit is illustrated in FIG. 6. In that embodiment, each gate of transistors 51a-54a and 51b-54b, and the extension of those gates to the corresponding control lines, are made of doped polysilcion. This polysilicon lies on an insulating layer, such as SiO$_2$, which in turn lies on the semiconductor surface.

Input buss lines 41a-1 through 41f-1, output buss lines 42a-1 and 42b-1, and control lines 38-1 through 38-4 are all metal lines. These metal lines lie on another insulating layer which overlies the polysilicon.

The source of each transistor 52a-54f and 51b-54b, and their extensions to output busses 42a-1 and 42b-1 are formed by diffusions in the surface of the semiconductor substrate. Also, the drain of those transistors, as well as the drain extensions across input buss lines 41a-1 through 41f-1 are also formed by diffusions in the semiconductor's surface.

Selectable contact between a metal line 41a-1 through 41f-1 and a diffusion which crosses under those lines is made by an optional diffusion as indicated by reference numeral 71. That is, each of the metal lines 41a-1 through 41f-1 penetrate through the insulating layer to the semiconductor's surface at the locations marked by reference numeral 72 in FIG. 6; and there the optional diffusions 71 contact the metal lines.

In an alternative embodiment, all of the optional diffusions 71 are eliminated; and the selectable contacts directly overlie the extended drain diffusion regions. In this embodiment, the metal input buss lines 41a-1 through 41f-1 penetrate the insulating layer on which they lie only at the points where contact is to be made with the underlying extended drain diffusion. Reference numeral 73 indicates the location of some of these selectable contacts.

Various preferred embodiments of the invention have now been described in detail. In addition, many changes and modifications may be made to these details without departing from the nature and spirit of the invention. Thus it is to be understood that the invention is not limited to said details but as defined by the appended claims.

What is claimed is:

1. On a semiconductor chip, a digital device comprised of:
    a plurality of storage means for storing digital signals therein;
    a plurality of functional means for performing functional operations on digital signals; and
    an interconnect matrix having a plurality of multibit input busses connected to receive signals from said storage means and said functional means, and having a plurality of multibit output busses connected to send signals to said storage means and said functional means;
    wherein said interconnect matrix further includes a first set of selectable electrical contacts defining a first set of parallel paths by which respective bits on any desired subset of said input busses pass to corresponding bits on any desired subset of said output busses; a second set of selectable electrical contacts defining a second set of parallel paths different from said first set by which respective bits on any other desired subset of said input busses pass to corresponding bits on any other desired subset of said output busses; control inputs for receiving first and second control signals; means responsive to said first control signals for transferring signals between said input and output busses via said first set of paths, and means responsive to said second control signals for transferring signals between said input and output busses via said second set of paths.

2. A digital device according to claim 1 wherein each electrical contact in said selectable sets is a selectable doped region in said semiconductor chip.

3. A digital device according to claim 1 wherein each electrical contact in said selectable sets is a selectable metal region lying on said semiconductor chip.

4. A digital device according to claim 1 wherein said input busses lie transverse to said output busses in a region of said semiconductor chip where said selectable sets of electrical contacts exist.

5. A digital device according to claim 1 wherein one of said sets of electrical contacts intercouples each output buss to a different input buss.

6. A digital device according to claim 1 wherein one of said sets of electrical contacts intercouples some output busses to the same input buss, and other output busses to different input busses.

7. A digital device according to claim 1 wherein one of said sets of electrical contacts intercouples one output buss to selected portions of at least two different input busses.

8. A digital device according to claim 1 wherein said means for transferring signals is comprised of first and second sets of transistors, with each set of transistors being responsive to a respective one of said control signals for providing conductive paths from said input busses through a respective set of said electrical contacts to said output busses.

9. On a semiconductor chip, a programmable interconnect matrix comprised of:
    a plurality of multibit input busses and a plurality of multibit output busses for carrying signals thereon;
    multiple sets of selectable electrical contacts, each set of contacts defining a set of parallel paths by which respective bits on any desired subset of said input busses pass to corresponding bits on any desired subset of said output busses;
    control inputs for receiving multiple control signals; and
    means responsive to said control signals for transferring signals between said input and output busses via any set of said paths.

10. A programmable interconnect matrix according to claim 9 wherein each electrical contact in said selectable sets is a selectable doped region in said semiconductor chip.

11. A programmable interconnect matrix according to claim 9 wherein each electrical contact in said selectable sets is a selectable metal region lying on said semiconductor chip.

12. A programmable interconnect matrix according to claim 9 wherein said input busses lie transverse to said output busses in a region of said semiconductor chip where said selectable sets of electrical contacts exist.

13. A programmable interconnect matrix according to claim 9 wherein one of said sets of electrical contacts intercouples each output buss to a different input buss.

14. A programmable interconnect matrix according to claim 9 wherein one of said sets of electrical contacts intercouples some output busses to the same input buss, and other output busses to different input busses.

15. A programmable interconnect matrix according to claim 9 wherein one of said sets of electrical contacts intercouples one output buss to selected portions of at least two different input busses.

16. A programmable interconnect matrix according to claim 9 wherein said means for transferring signals is comprised of multiple sets of transistors, with each set of transistors being responsive to a respective one of said control signals for providing conductive paths from said input busses through a respective set of said electrical contacts to said output busses.

* * * * *